United States Patent Office 2,951,834
Patented Sept. 6, 1960

2,951,834

MIXED ANHYDRIDES AND THEIR USE AS CATALYSTS FOR THE POLYMERISATION OF ETHYLENICALLY UNSATURATED COMPOUNDS

Gerald Scott, Manchester, England, assignor to Imperial Chemical Industries Limited, London, England, a corporation of Great Britain No Drawing. Filed Mar. 25, 1958, Ser. No. 723,645

Claims priority, application Great Britain Apr. 1, 1957

13 Claims. (Cl. 260—94.9)

This invention relates to mixed anhydrides and to their use as catalysts for the polymerisation of ethylenically unsaturated compounds.

According to the invention there are provided mixed anhydrides of hyponitrous acid and at least one organic monoester of carbonic acid.

The mixed anhydrides of this invention have the general formula

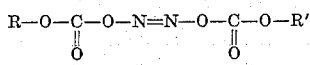

where R and R′ stand for alkyl, cycloalkyl, heterocycloalkyl, aralkyl, allyl or aryl groups, which groups may be substituted or unsaturated. The groups R and R′ may be substituted, for example, by halogens, alkoxy, cyano, or ester groups, or by radicals containing one or more further alkoxyformyl hyponitrite residues, in which case the product is polymeric. In all cases, R and R′ may be the same or different.

The invention also includes a process for the production of the mixed anhydrides that comprises interacting at a temperature below 0° C. hyponitrous acid or a salt thereof with at least one haloformic ester of the formula

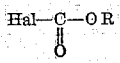

wherein R has the significance hereinbefore described, preferably the chloroformic ester. Salts of hyponitrous acid that may be used include the silver, lead, thallium, copper, potassium or ammonium salts. The silver salt is generally preferred because it is readily prepared in a pure state and is highly reactive. When hyponitrous acid is used it may be convenient to generate it from an inorganic hyponitrite by means of a strong acid such as hydrogen chloride.

The reaction between the hyponitrous acid or salt and the haloformic ester may be performed in a solvent medium for the haloformic ester and the mixed anhydride; for example, ketones, ethers, esters, amides, nitriles, aliphatic nitro compounds, halogenated hydrocarbons, petroleum hydrocarbons or aromatic hydrocarbons may be used. It is essential that the solvent should remain liquid at the low temperature of reaction. The solvent may be gaseous at room temperature, but may be liquid at the reaction temperature with or without the application of a moderate pressure. Suitable solvents include acetone, nitroethane, ethylene glycol diether ether, acetonitrile, diethyl oxalate, and dimethyl ether; acetone is a particularly satisfactory solvent. The reaction is considerably assisted by the presence of a tertiary base, especially pyridine, or salts thereof. The tertiary base or its salt is best used in quantities of 10–1,000 p.p.m. of the amount of haloformic ester when the latter is reacted directly with an inorganic hyponitrite, although larger quantities may be used if desired. When the haloformic ester is reacted with hyponitrous acid, it is desirable to have present an amount of base chemically equivalent to the amount of reactive halogen present in the system.

The rate of reaction may be controlled by external cooling of the reaction mixture or by allowing solvent to evaporate in a controlled manner, for example by manipulation of the pressure, usually to maintain a temperature of —80° to —20° C., preferably below —40° C. and as low as —110° C. if desired.

The products of the reaction between hyponitrous acid or a metal hyponitrite and the haloformic esters are relatively unstable materials and products of different stability may be obtained according to the conditions under which the reaction is carried out. The less stable products are preferred for use as catalysts, and their formation is favoured by the use of short reaction times which in turn are favoured by small particle size of starting materials and the presence of an excess of hyponitrous acid or salt.

When the reaction between a haloformic ester and a metallic hyponitrite is finished the metal halide co-product may readily be removed, for example by filtration. Much of the desired mixed anhydride may remain adsorbed on the insoluble halide and it is desirable to wash the residue thoroughly. By this means the total yield of mixed anhydride may be more than doubled in certain cases. If a relatively non-polar medium is used in the reaction it may be desirable to elute the residue with a more polar solvent. The solution of the mixed anhydride so obtained is generally used as such in the polymerisation of ethylenically unsaturated compounds; however, the mixed anhydride may be isolated from the solution, for example by evaporation of the solvent at low temperature or by crystallisation at low temperature. The pure mixed anhydrides may be dangerously unstable and it is for this reason that their isolation is usually avoided.

Examples of the mixed anhydrides of this invention are the mixed anhydrides of hyponitrous acid and methoxy, ethoxy, propoxy, isopropoxy, n-butoxy, sec-butoxy, tert-butoxy, amyloxy, allyloxy, benzyloxy, cyclohexanoxy, tetrahydrofurfuranoxy, 3.5.5 trimethylhexanoxy, 2-ethylhexanoxy, p-tolyloxy, o-chlorophenyloxy, 1-carbethoxypropan-2-oxy, β-methoxyethoxy and β-chloroethoxy formic acids.

The mixed anhydrides, which are catalytically active, decompose at appreciable rates with evolution of gas at temperatures as low as —40° C. Pure catalytically active mixed anhydrides yield approximately 50% $CO_2$ and 50% $N_2$ in the gaseous decomposition products. Small amounts of nitrous oxide are often found also and the amounts may be considerable when impure silver hyponitrite or peroxydized solvents have been used in the preparation. Products which yield much nitrous oxide are less desirable as catalysts.

The mixed anhydrides are valuable catalysts for the polymerisation and copolymerisation of ethylenically unsaturated compounds, including dienes; this use of the mixed anhydrides is a further feature of our invention. The mixed anhydrides are particularly useful for the polymerisation of ethylene to give solid polymers at temperatures as low as —40° C. and pressures above 100 atmospheres, preferably between 1,000 and 3,000 atmospheres, and to give high rates of polymerisation at room temperature. If provision is made for the control of fast reactions and removal of large quantities of heat as in a continuous process, very high rates of polymerisation may be obtained at temperatures as high as 180° C. The pressure preferred depends to some extent on the desired temperature of operation and is chosen so that the gas density always exceeds 0.21 gm./cc. The use of the mixed anhydride at low temperatures is especially valuable because branching of the polymer chains decreases with decreasing polymerisation temperatures, and the more linear polymers obtained at low temperatures are stiffer and of higher melting point and density than those producted at high temperatures. Low temperature processes are capable of giving polymers of density exceeding 0.95 if desired. The melt viscosity and molecular weight of the polymers may be modified to any desired level for the purposes of fabrication or strength by choice of reaction pressure and by the addition to the polymerisation reaction vessel of chain-transfer agents such as hydrogen, carbon tetrachloride or other chlorinated hydrocarbons, lower alkanes or cycloalkanes, ethers and esters. Inert diluents may also be present.

Other ethylenically unsaturated compounds that may advantageously be polymerised and copolymerised among themselves or with ethylene by general methods described in the prior art or used hitherto, but with the use of the mixed anhydrides of this invention as catalysts, include, for example: styrene, methyl methacrylate, vinyl acetate, vinyl chloride, isoprene, butadiene, acrylonitrile, fluoroethylenes, propylene, N-vinylphthalimide, methacrylamide, vinylidene chloride, chloroprene, fluoroprene, N-vinylcarbazole, N-vinyl pyrollidone, acenaphthene, maleic anhydride, indene, chlorinated styrenes and diallyl fumarate. The polymerisation of these monomers may be carried out at normal or elevated or reduced pressures or temperatures and in the presence or absence of inert solvents or other diluents such as water or gaseous or liquid hydrocarbons. In general, the only change introduced by the use of the new catalysts in the polymerisation processes of the prior art is that for a given polymerisation temperature the rate of polymerisation is surprisingly increased. Correspondingly, the polymerisation temperature required for a given rate of polymerisation is surprisingly lowered. For example, for a given rate of reaction the use of the mixed anhydrides disclosed in this invention permits the use of temperatures approximately 110° C. lower than would be possible if lauroyl peroxide were used as catalyst. This change is very valuable since it affords possibilities of more economical working or the production of modified polymeric forms consequent upon the use of lower polymerisation temperatures.

The invention is illustrated but not limited by the following examples, in which parts and percentages are by weight. In the processes of Examples 1 to 30 the yield of the mixed anhydrides in solution is determined by the following method:

10 parts of the solution suitably diluted if necessary, for example with 50 parts of toluene, are heated from −60° C. in an azotometer. The yield of the mixed anhydride in solution is calculated from the total volume of nitrogen and nitrous oxide evolved, the percentage yield being based on the metal hyponitrite originally in the suspension.

Examples 1 to 30 relate to the production of the mixed anhydrides, generally in solution; Examples 30 to 37 relate to the use of the mixed anhydrides as catalysts for the polymerisation and copolymerisation of ethylene; and Examples 38 to 49 relate to their use as catalysts for the polymerisation of other monomers.

Example 1

24 parts of ethyl chloroformate are added slowly to 27.6 parts of silver hyponitrite suspended in 200 parts of nitroethane at −60° C. The mixture is stirred at −20° C. for five hours and although the reaction is incomplete the suspension is then filtered, cooled to −60° C. and washed with two portions each of 150 parts of the solvent at −60° C. The yield of ethoxyformyl hyponitrite in solution is 5%. Nearly all of the gas is evolved between −20° and +40° C. when the solution is heated.

Example 2

24 parts of ethyl chloroformate are added slowly to 27.6 parts of silver hyponitrite suspended in 200 parts of acetonitrile at −40° C. The mixture is stirred at −20° C. for 4½ hours and although the reaction is incomplete the suspension is filtered by the method used in Example 1. The yield of ethoxyformyl hyponitrite is 7% and all of this decomposes between −20° and +30° C.

Example 3

To a suspension of 27.6 parts of silver hyponitrite in 108 parts of acetone at −60° C. is added a solution of 7.3 parts of hydrogen chloride in 92 parts of acetone. To the solution of hyponitrous acid thus formed at −60° C. are added 19 parts of ethyl chloroformate. The mixture is then stirred at −30° C. for two hours and the suspension is filtered by the method used in Example 1. Two-thirds of the gaseous decomposition products corresponding roughly to a 5% yield of ethoxyformyl hyponitrite are released between −30° C. and 0° C.

Example 4

The process of Example 3 is repeated except that 16 parts of pyridine are added after the addition of the ethyl chloroformate, and the whole mixture is then stirred at −30° C. for only one hour before the suspension is filtered by the method used in Example 1. The yield of ethoxyformyl hyponitrite is 35% and the product decomposes between −30° and +30° C.

Examples 5, 6 and 7

Example 4 is repeated but with the differences indicated below:

| Example | Chloroformate | Parts | Temp., °C. | Time, hrs. | Yield, percent |
|---|---|---|---|---|---|
| 5 | methyl | 15 | −30 | 2 | 22 |
| 6 | isopropyl | 25 | −40 | 2 | 25 |
| 7 | isobutyl | 24 | −40 | 2 | 4 |

Example 8

138 parts of silver hyponitrite are stirred at −60° in 50 parts of acetone. 105 parts of ethyl chloroformate in 50 parts of cooled acetone are added followed by a trace of pyridine hydrochloride (30 p.p.m.), and the mixture is then stirred for 1½ hours, filtered and the residue washed with 150 parts of cooled acetone.

The yield of ethoxyformyl hyponitrite is 85%. The solution decomposes at a measurable rate at −10° C.; the gases evolved include $N_2$ 44%, $CO_2$ 42%, and $N_2O$ 6.5%.

Example 9

138 parts of silver hyponitrite and 160 parts of cyclohexyl chloroformate are reacted at −40° C. according to the procedure of Example 8.

The yield of cyclohexoxyformyl hyponitrite is 58%. The solution decomposes at a measurable rate at 0° C. and the gas evolved contains 35% $N_2$, 40% $CO_2$ and 12% $N_2O$. On cooling the solution to −75° C., white crystals separate out. These are washed with ether and dried under vacuum at −50° C. Analysis of crystals for % N is carried out by sealing a 2 mg. (approx.) sample in a strong glass tube held on Drikold and then allowing the tube to warm to room temperature before weighing the sample, which meanwhile decomposes within the tube. The tube is broken in an atmosphere of $CO_2$ and the contents analysed for percent N by the standard Dumas technique. Using a similar technique for preparing the sample for analysis, percent Cl is determined by the Gröte method. The crystals are found to contain 8.2% N (theory for $C_6H_{11}O.CO.ON{=}NO.OC.C_6H_{11}$ is 8.9%) and <0.01% Cl.

Example 10

70 parts of silver hyponitrite and 100 parts of β-phenoxyethyl chloroformate are reacted at −40° C. according to the procedure of Example 8.

The yield of β-phenoxyethoxyformyl hyponitrite is 40%. The solution begins to decompose at a measurable rate at +10° C.; the gaseous decomposition products include 42% $N_2$, 40% $CO_2$ and 3% $N_2O$. The hyponitrite settles out as white crystals when cooled below —50° C.

*Example 11*

140 parts of silver hyponitrite are stirred in 500 parts of acetone at —75° C., and 425 parts of acetone (HCl (0.058 g./ml.)) are added and stirred until the solid is decolourised. 210 parts of 3:5:5 trimethylhexyl-chloroformate in 500 parts of acetone and 80 parts of pyridine are added and stirring is continued for 3 hours at —75° C. The mixture is filtered at reaction temperature and washed with 1,500 parts of cooled acetone.

The yield is 78% of 3:5:5 trimethylhexoxyformyl hyponitrite. The solution decomposes at a measurable rate of —5° C. Gases evolved include $CO_2$ (45%), $N_2O$ (5.5%) and $N_2$ (48%).

*Example 12*

23 parts of iso-propyl chloroformate are added slowly to 27.6 parts of silver hyponitrite suspended in 200 parts of acetone at —60° C. The mixture is stirred at —40° C. for three hours and although the reaction is incomplete the suspension is filtered by the method used in Example 1. The yield of iso-propoxyformyl hyponitrite is 33% and this decomposes between —20° and +30° C.

*Example 13*

19 parts of ethyl chloroformate are added slowly to 27.6 parts of silver hyponitrite suspended in 200 parts of acetone at —60° C. 16 parts of pyridine are added and then a further 100 parts of acetone to dilute the suspension. The mixture is then stirred at —50° C. for 2 hours and the suspension is filtered by the method used in Example 1. The yield of ethoxyformyl hyponitrite is 55% and all of this decomposes between —30° and +40° C.

*Examples 14–21*

Example 13 is repeated but with the differences indicated below:

| Example | Chloroformate | Parts | Temp., °C. | Time, hrs. | Yield, percent |
|---|---|---|---|---|---|
| 14 | methyl | 15 | —50 | 2 | 15 |
| 15 | n-butyl | 24 | —40 | 2 | 40 |
| 16 | iso-butyl | 24 | —40 | 1 | 11 |
| 17 | iso-amyl | 24 | —40 | 4 | 30 |
| 18 | 3.5.5 trimethylhexyl | 40 | —30 | 0.5 | 18 |
| 19 | tetrahydrofurfuryl | 25 | —40 | 4 | 20 |
| 20 | cyclo-hexyl | 30 | —20 | 1.5 | 8 |
| 21 | β-phenoxyethyl | 31 | —40 | 11.5 | 5 |

*Example 22*

18 parts of ethyl chloroformate are added slowly to 27.6 parts of silver hyponitrite suspended in 200 parts of acetone at —60° C. Two parts of pyridine are added and then a further 100 parts of acetone to dilute the suspension. The mixture is then stirred at —50° C. for 2 hours and the suspension is filtered by the method used in Example 1. The yield of ethoxyformyl hyponitrite is 63% and the product decomposes between —40° and +30° C.

*Examples 23, 24 and 25*

Example 22 is repeated but with the differences indicated below:

| Example | Chloroformate | Parts | Temp., °C. | Time, hrs. | Yield, percent |
|---|---|---|---|---|---|
| 23 | n-butyl | 24 | —40 | 1 | 52 |
| 24 | iso-propyl | 23 | —40 | 3 | 54 |
| 25 | cyclo-hexyl | 30 | —30 | 5.75 | 16 |

*Example 26*

140 parts of silver hyponitrite are suspended in 500 parts of diethyl oxalate and 50 parts of n-hexane. 1 part of pyridine hydrochloride is added and the whole is stirred at —50° C. A solution of 108 parts of ethyl chloroformate in 500 parts of diethyl oxalate and 50 parts of n-hexane is precooled to —60° C. and added slowly to the silver hyponitrite suspension. The mixture is stirred at —50° C. for 6 hours, and is then filtered at —40° C. The residue is washed with 1,500 parts of diethyl oxalate.

The yield of ethoxyformyl hyponitrite is 20% and the decomposition gases include 51% $N_2$, 7.5% $N_2O$, 40% $CO_2$.

*Example 27*

138 parts of silver hyponitrite in 710 parts of diethyl-ether are stirred with 450 parts of ether containing 12 parts HCl/part for 1 hour at —60° C. The solution is filtered and the filtrate is added to a solution of 94 parts of methyl chloroformate and 39 parts of pyridine in 355 parts of diethylether and the whole is stirred at —60° C. for 1½ hours. The yield of methoxyformyl hyponitrite is 20%.

*Example 28*

24 parts of iso-propyl chloroformate are added slowly to 27.6 parts of silver hyponitrite suspended in 200 parts of acetone at —60° C. 23.6 parts of pyridine hypochloride are added and the whole mixture is then stirred at —40° C. for 2 hours. The suspension is filtered by the method used in Example 1 and the yield of iso-propoxyformyl hyponitrite is 43%. About 95% of the gaseous decomposition products are evolved between —20° and +30° C.

*Example 29*

24 parts of iso-propyl chloroformate are added slowly to 27.6 parts of silver hyponitrite suspended in 200 parts of dimethylformamide at —60° C. The mixture is stirred at —20° C. for 4 hours and then the suspension is filtered by the method used in Example 1 to give a moderate yield of iso-propoxyformyl hyponitrite which decomposes between —20° and +30° C.

*Example 30*

54 parts of ethyl chloroformate and 70 parts of silver hyponitrite are mixed for 2 hours at —60° C. in 1,000 parts of acetone in the presence of a trace of pyridine hydrochloride. The mixture is filtered and the residue washed with 1,500 parts cooled acetone and the two solutions bulked. 100 parts of this solution, which contains 1.4 parts of ethoxyformyl hyponitrite, are charged to an evacuated high pressure autoclave cooled to —50° C. Liquid ethylene at —68° C. and 1,000 atmospheres pressure is then injected into the autoclave. The internal temperature momentarily rises to —6° C. but in 8 minutes settles to —55° C. at a pressure of 1,000 atmospheres.

The stirrer of the autoclave is started and the system is gradually warmed to —10° C. during 50 minutes, the pressure rising to 1,185 atmospheres. In 3 hours after reaching —10° C. the pressure has fallen to 1090 atmospheres. The pressure is released and the vessel is allowed to warm to room temperature and is then opened. It is found to contain a white solid polymer which is purified by solution in xylene, precipitation in methanol, filtration and drying in vacuo. 200 parts of white solid ethylene polymer of density 0.950 and grade number 0.011 are recovered.

*Example 31*

500 parts of acetone containing 30 parts of 3:5:5 trimethylhexoxyformyl hyponitrite are used in the polymerisation of ethylene at 10° C. and 1,000 atmospheres pressure according to the procedure of Example 30.

The product is a solid which when purified as described in Example 30 yields 350 parts of a white solid ethylene polymer of density 0.973.

Example 32

800 parts of acetone containing 6 parts of iso-propoxyformyl hyponitrite are used in the polymerisation of ethylene at 0° C. and 1,000 atmospheres according to the procedure of Example 30.

The product is a solid which when purified as described in Example 30 yields 250 parts of white solid ethylene polymer.

Example 33

50 parts of acetone containing 3.6 parts of ethoxyformyl hyponitrite are used in the polymerisation of ethylene according to the procedure of Example 30 at −10° C. and 1,000 atmospheres pressure in the presence of 5 atmospheres hydrogen.

The product is a white solid which when purified as described in Example 30 yields 220 parts of white solid ethylene polymer of density 0.943 and grade number 0.034.

Example 34

50 parts of acetone containing 1.8 parts of ethoxyformyl hyponitrite are used in the polymerisation of ethylene according to the procedure of Example 30 at −10° C. and 1,000 atmospheres pressure, in the presence of 25 parts of 5% solution of carbon tetrachloride in benzene.

The product is a white solid which when purified as described in Example 30 yields 30 parts of white solid ethylene polymer, density 0.952 and grade number 0.024.

Example 35

300 parts of acetone containing 8 parts of cyclohexoxyformyl hyponitrite are used in the polymerisation of ethylene at 1,000 atmospheres and 0° C. according to the procedure of Example 30.

The product is a white solid which when purified as in Example 30 yields 280 parts of white solid ethylene polymer of density 0.950 and grade number 0.56.

Example 36

200 parts of acetone containing 1.9 parts of ethoxyformyl hyponitrite are used in the polymerisation of ethylene at 2,000 atmospheres, and −20° C. according to the procedure of Example 30.

The product is a white solid which when purified as in Example 30 gives 70 parts of white solid ethylene polymer of density 0.943 and grade number 0.0013.

Example 37

100 parts of acetone containing 1.7 parts of ethoxyformyl hyponitrite are used in the polymerisation of ethylene according to Example 30 at −10° and 1,000 atmospheres pressure, with the addition of 10 atmospheres propylene.

The product is a solid which when purified as in Example 30 yields 30 parts of white polymer.

Example 38

5 parts of the iso-propoxyformyl hyponitrite solution obtained by the process of Example 6 are added to 90 parts of acrylonitrile at −10° C. and oxygen is removed from the system by the evacuation of the gas space at this temperature. On warming the mixture to 0° C. the acrylonitrile polymerises and 95% is precipitated as a solid in ¾ hour.

Example 39

5 parts of the n-butoxyformyl hyponitrite solution obtained by the process of Example 15 are added to 90 parts of acrylonitrile at −50° C. and oxygen is removed from the system by evacuation of the gas space at this temperature. On warming the mixture to 20° C. the acrylonitrile polymerises and 50% is precipitated as a solid in half an hour.

Example 40

10 parts of the iso-butoxyformyl hyponitrite solution obtained by the process of Example 16 are added to 90 parts of acrylonitrile at −50° C. and oxygen is removed from the system by evacuation of the gas space at this temperature. On warming the mixture to 22° C. the acrylonitrile polymerises and 20% is precipitated as a solid in an hour.

Example 41

10 parts of the tetrahydrofurfuroxyformyl hyponitrite solution obtained by the process of Example 19 are added to 90 parts of acrylonitrile at −60° C. and oxygen is removed from the system by evacuation of the gas space at this temperature. On warming the mixture to 23° C. the acrylonitrile polymerises and 20% is precipitated as a solid in 60 hours or less.

Example 42

5 parts of the ethoxyformyl hyponitrite solution obtained by the process of Example 22 are added to 90 parts of acrylonitrile at −60° C. and oxygen is removed from the system by evacuation of the gas space at this temperature. On warming the mixture to 22° C. the acrylonitrile polymerises and about 95% is precipitated as a solid in half an hour.

Example 43

10 parts of the cyclo-hexoxyformyl hyponitrite solution obtained by the process of Example 25 are added to 90 parts of acrylonitrile at −60° C. and oxygen is removed from the system by evacuation of the gas space at this temperature. On warming the mixture to 23° C. the acrylonitrile polymerises and about 95% is precipitated as a solid in 20 minutes.

Example 44

8 parts of the ethoxyformyl hyponitrite solution obtained by the process of Example 4 are added to 90 parts of vinyl acetate at 0° C. and oxygen is removed from the system by the evacuation of the gas space at this temperature. On warming the mixture to 24° C. the vinyl acetate polymerises to give a thick viscous liquid in 16 hours or less.

Example 45

5 parts of the iso-propoxyformyl hyponitrite solution obtained by the process of Example 6 are added to 90 parts of vinyl acetate at −10° C. and oxygen is removed from the system by evacuation of the gas space at this temperature. On warming the mixture to 0° C. the vinyl acetate polymerises to give a thick viscous liquid in ¾ hour.

Example 46

10 parts of the iso-amyloxyformyl hyponitrite solution obtained by the process of Example 17 are added to 90 parts of vinyl acetate at −50° C. and oxygen is removed from the system by evacuation of the gas space at this temperature. On warming the mixture to 22° C. the vinyl acetate polymerises to give a thick viscous liquid in ½ hour.

Example 47

5 parts of the iso-propoxyformyl hyponitrite solution obtained by the process of Example 24 are added to 90 parts of vinyl acetate at −60° C. and oxygen is removed from the system by evacuation of the gas space at this temperature. On warming the mixture to 22° C. the vinyl acetate polymerises and becomes quite viscous in 1½ hours.

Example 48

The process of Example 47 is repeated using 90 parts of methyl methacrylate in place of the vinyl acetate. A good yield of solid polymer is isolated after 1½ hours.

Example 49

2 parts of the iso-propoxyformyl solution obtained by the process of Example 28 are added to 90 parts of acrylonitrile at —40° C. and oxygen is removed from the system by evacuation of the gas space at this temperature. On warming to room temperature the acrylonitrile polymerises and about 95% is precipitated as a solid in 15 minutes.

I claim:

1. A process for the production of mixed anhydrides which comprises reacting at a temperature not exceeding 0° C., silver hyponitrite, and a chloroformic ester of the formula Cl.CO.OR wherein R is selected from the class consisting of alkyl, allyl, monocyclic aryl, cycloalkyl, alkoxy-alkyl, aryloxy alkyl, tetrahydrofurfuryl, halophenyl, carbalkoxy-alkyl and haloalkyl groups.

2. A process according to claim 1 in which the reaction takes place at a temperature of —80° C. to —40° C.

3. A process according to claim 1 in which the mixed anhydride is separated by crystallization below —20° C.

4. A process according to claim 1 in which the solvent is evaporated below —20° C.

5. A process according to claim 1 in which the reaction is conducted in a solvent for the chloroformic ester and the mixed anhydride produced by the reaction.

6. A process according to claim 5 in which the reaction medium contains a compound selected from the group consisting of pyridine and pyridine hydrochloride.

7. A process according to claim 6 in which the reaction medium contains 10–1,000 p.p.m., of said compound.

8. A process for the production of polymers which comprises subjecting a compound selected from the class consisting of ethylene, vinyl acetate, methyl methacrylate and acrylonitrile to polymerization conditions in the presence of a catalytic amount of a mixed anhydride at a temperature not lower than —40° C., said anhydride having the formula:

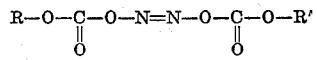

wherein R and R' are selected from the class consisting of alkyl, allyl, monocyclic aryl, cycloalkyl, alkoxy-alkyl, aryloxy alkyl, tetrahydrofurfuryl, halophenyl, carbalkoxy-alkyl and haloalkyl groups.

9. A process as claimed in claim 8 wherein the compound is ethylene, same being contacted at a temperature between —40° C. and 180° C. and a pressure above 100 atmospheres with a catalytic amount of a solution of a mixed anhydride as defined in claim 8.

10. A process as claimed in claim 9 operated at a pressure between 1,000 to 3,000 atmospheres.

11. A process as claimed in claim 9 operated at a pressure such that the gas density exceeds 0.21 gm./cc. at the temperature of operation.

12. A process as claimed in claim 9 which is carried out in the presence of a chain-transfer agent selected from the group consisting of hydrogen and carbon tetrachloride.

13. Mixed anhydride having the general formula

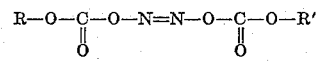

wherein R and R' are selected from the group consisting of alkyl, allyl, monocyclic aryl, cycloalkyl, alkoxy-alkyl, aryloxy alkyl, tetrahydrofurfuryl, halophenyl, carbalkoxy-alkyl, haloalkyl.

References Cited in the file of this patent

UNITED STATES PATENTS 2,816,883     Larchar               Dec. 17, 1957

FOREIGN PATENTS 538,782     Belgium               Dec. 6, 1955